US007792263B2

(12) United States Patent
D'Amora et al.

(10) Patent No.: US 7,792,263 B2
(45) Date of Patent: *Sep. 7, 2010

(54) METHOD, SYSTEM, AND COMPUTER PROGRAM PRODUCT FOR DISPLAYING IMAGES OF CONFERENCE CALL PARTICIPANTS

(75) Inventors: Bruce D. D'Amora, New Milford, CT (US); Charles R. Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1241 days.

This patent is subject to a terminal disclaimer.

(21) Appl. No.: 11/354,426

(22) Filed: Feb. 15, 2006

(65) Prior Publication Data
US 2007/0200919 A1 Aug. 30, 2007

(51) Int. Cl.
*H04M 7/00* (2006.01)
(52) U.S. Cl. .................. 379/202.01; 370/261; 709/204

(58) Field of Classification Search ............ 379/202.01; 370/261; 709/204
See application file for complete search history.

(56) References Cited

U.S. PATENT DOCUMENTS

| 2003/0023854 A1* | 1/2003 | Novak et al. ............... 713/182 |
| 2005/0149876 A1* | 7/2005 | Kortum et al. ............. 715/753 |
| 2005/0157174 A1* | 7/2005 | Kitamura et al. ........ 348/207.99 |
| 2007/0127669 A1* | 6/2007 | Shields .................. 379/202.01 |

* cited by examiner

*Primary Examiner*—Quynh H Nguyen
(74) *Attorney, Agent, or Firm*—Brian Verminski; Hoffman Warnick LLC

(57) ABSTRACT

The present invention provides a method, system, and computer program product for displaying images of conference call participants. A method in accordance with an embodiment of the present invention includes receiving a call from a user to join a conference call, obtaining a phone number of the user, matching the phone number to a stored graphical representation, and distributing and displaying the matching graphical representation to a predetermined set of users. A voice identification/recognition process can also be used to match the user to a stored graphical representation.

2 Claims, 5 Drawing Sheets

METHOD, SYSTEM, AND COMPUTER PROGRAM PRODUCT FOR DISPLAYING IMAGES OF CONFERENCE CALL PARTICIPANTS

BACKGROUND OF THE INVENTION

1. Field of the Invention

The present invention generally relates to conference calling systems, and more specifically relates to a method, system, and computer program product for displaying images of conference call participants.

2. Related Art

Conference calls are a standard method of communication in today's business environment. A common problem with conference calling is the determination of who is participating in the conference call. On many conference calls, a beep or series of beeps is used to indicate that someone has either joined or dropped the conference call. Some conference calling systems offer the ability for a participant to record a short message (e.g., name). This recorded message is played when the participant joins or exits the conference call. In either of these cases, the conference call is interrupted with an audio signal (e.g., beep(s), recorded name), which can be very distracting to the participants currently taking part in the conference call. Further, if a participant list is needed, the moderator of the conference call must stop and ask, for example, "Who is participating in the call?," "Who just joined the call?," etc. This process takes time and disrupts the flow of the conference call. Also, it is difficult to know exactly how many participants are actually taking part in the conference call at any given time. These problems raise security concerns because it is possible for an unauthorized person to "listen in" to a conference call without the knowledge of the other participants.

SUMMARY OF THE INVENTION

The present invention provides a method, system, and computer program product for displaying images of conference call participants.

A first aspect of the present invention is directed to a method for displaying images of conference call participants, comprising: receiving a call from a user to join a conference call; obtaining a phone number of the user; matching the phone number to a stored graphical representation; and distributing and displaying the matching graphical representation to a predetermined set of users.

A second aspect of the present invention is directed to a system for displaying images of conference call participants, comprising: a system for receiving a call from a user to join a conference call; a system for obtaining a phone number of the user; a system for matching the phone number to a stored graphical representation; and a system for distributing and displaying the matching graphical representation to a predetermined set of users.

A third aspect of the present invention is directed to a program product stored on a computer readable medium for displaying images of conference call participants, the computer readable medium comprising program code for performing the steps of: receiving a call from a user to join a conference call; obtaining a phone number of the user; matching the phone number to a stored graphical representation; and distributing and displaying the matching graphical representation to a predetermined set of users.

BRIEF DESCRIPTION OF THE DRAWINGS

These and other features of this invention will be more readily understood from the following detailed description of the various aspects of the invention taken in conjunction with the accompanying drawings in which.

Figure 1:
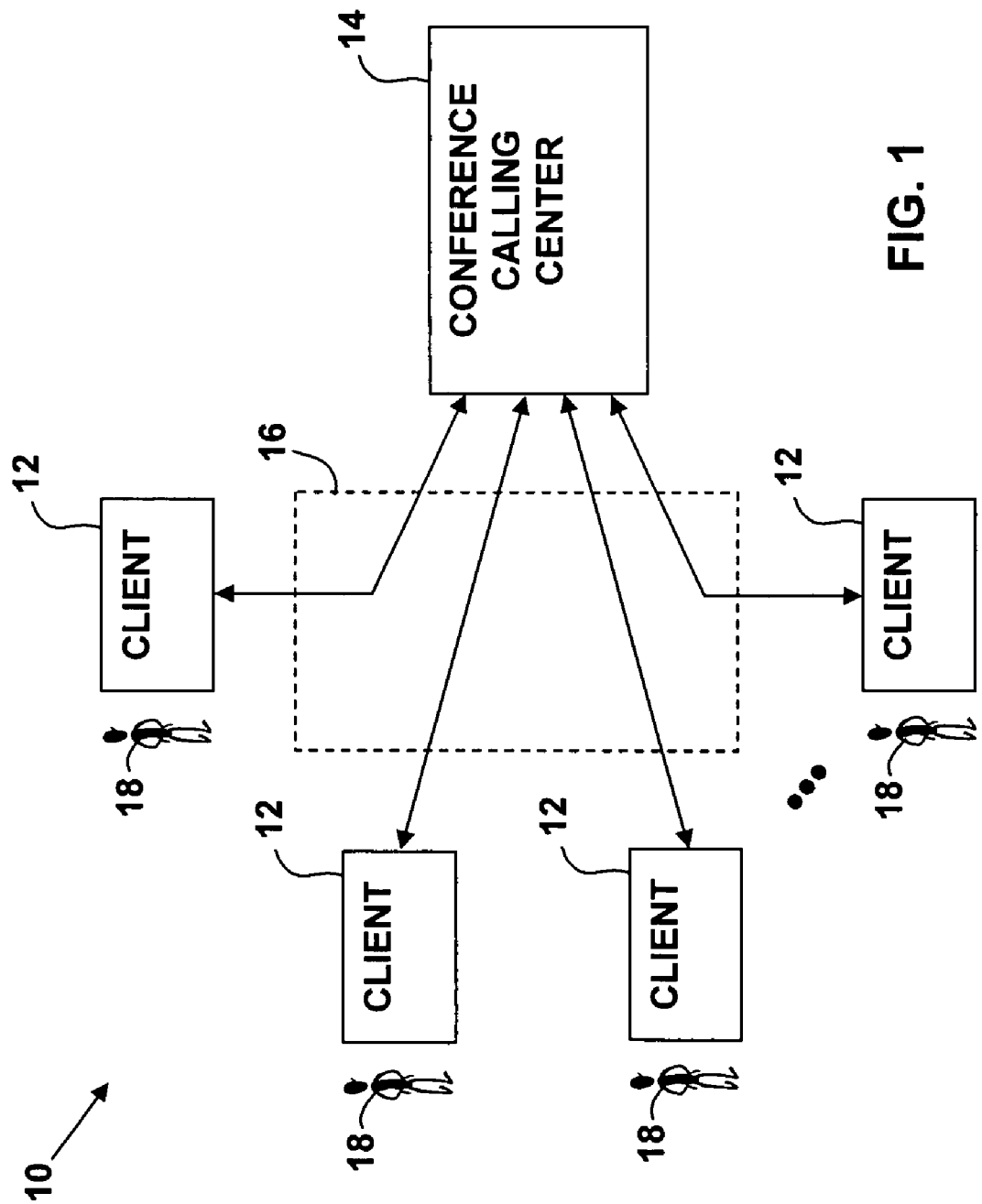
FIG. 1 depicts an illustrative conference calling system.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

An illustrative conference calling system 10 is depicted in FIG. 1. The conference calling system 10 generally comprises a plurality of client devices 12 connected to a conference calling center 14 (e.g., running on a web server) over a communication channel 16. Each client device 12 can be directly connected to the conference calling center 14 as shown, via a local server (not shown), or in any other suitable manner. The conference calling center 14 is responsible for forwarding all pertinent communications, voice and data, from any of the client devices 12 to any/all of the other client devices 12 in a manner known in the art. The communications channel 16 may be a telephone network, a local or wide area Ethernet network, the Internet, or any other communications medium, or combination thereof, over which voice data can be transmitted. Each client device 12 is operated by a user 18 and may comprise, for example, a phone system, computer workstation, cell phone, etc. Although the present invention will be described with regard to the illustrative conference calling system 10 depicted in FIG. 1, it will be apparent that the present invention can be configured for use with virtually any now known or later developed conference calling system. In addition, the present invention can be applied to Voice Over IP (VoIP).

Figure 2:
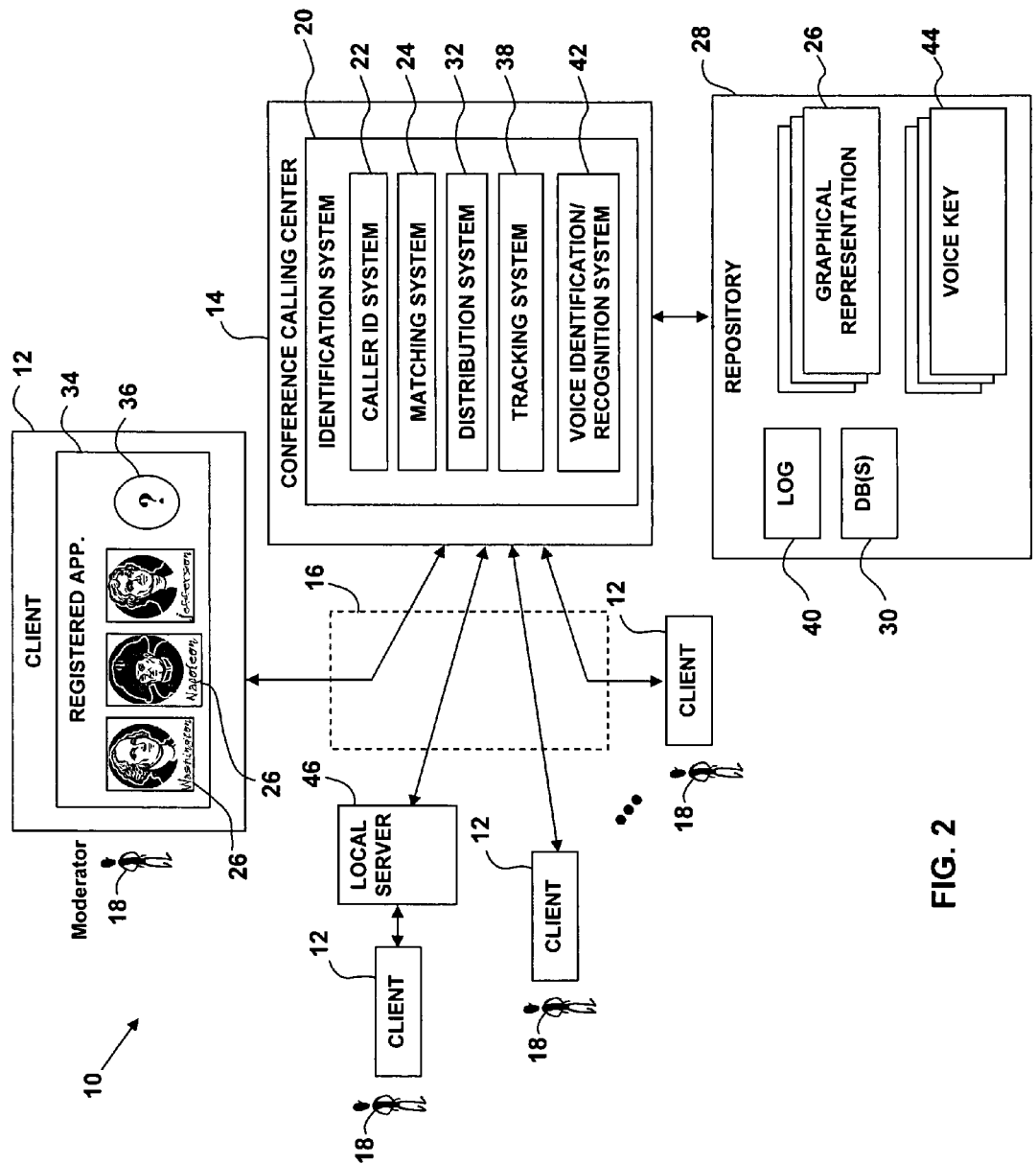
FIG. 2 depicts the illustrative conference calling system of FIG. 1 including a system for displaying images of conference call participants in accordance with embodiments of the present invention.

In accordance with an embodiment of the present invention, as shown in FIG. 2, the conference calling center 14 includes an identification system 20 for providing a graphical representation (e.g., image, animation, etc.) corresponding to each user 18 participating in a conference call. The identification system 20 includes a caller identification (ID) system 22 for determining what phone numbers are calling into the conference call at any given time and a matching system 24 for associating one or more graphical representations 26 stored in a (secure) repository 28 to each phone number obtained by the caller ID system 22. This can be done, for example, using one or more databases 30 (e.g., stored in the repository 28) containing entries correlating phone numbers, users 18, and graphical representation 26. For example, a database 30 may include an entry associating the number 555-555-5555 to John Smith and another entry associating John Smith to a particular graphical representation 26 (e.g., a photo of John Smith's face) stored in the repository 28. The graphical representation 26 of each user 18 can be obtained from a corporate directory, supplied by each user 18, or provided in any other suitable manner. The graphical representation 26 can also include a name or other identifier (e.g., employee number) to facilitate the visual identification of the user 18.

The identification system 20 further includes a distribution system 32 for distributing the graphical representations 26 provided by the matching system 24 to a predetermined set of users 18 participating in the conference call. The predetermined set of users 18 can include, for example, one user 18 (e.g., the moderator of the conference call), a plurality of users 18, or all of the users 18 participating in the conference call. The graphical representations 26 can be distributed, for example, to a registered application 34 (e.g., a Web page displayed in a Web browser, an e-meeting application, an instant messaging (IM) application, etc.) running on the respective client devices 12.

The identification system 20 is configured to continuously monitor the users 18 participating in a conference call and to continuously update the distributed graphical representations 26. This allows the predetermined set of users 18 receiving the distributed graphical representations 26 to see who has entered (or who is attempting to enter) and exited the conference call in "real time." Alternatively, the identification system 20 can be configured to periodically monitor (e.g., once per minute) the users 18 participating in the conference call and to periodically update the distributed graphical representations 26 as necessary.

A plurality of graphical representations 26 can be associated with a single phone number. This could be the case, for example, when a group of users 18 at a particular location (e.g., in a conference room) are participating in a conference call. In this case, graphical representations 26 corresponding to all of the users 18 in the group of users 18 would be distributed. For example, if the group of users 18 includes User 1, User 2, and User 3, then the distributed graphical representations 26 would include the graphical representations 26 associated with User 1, User 2, and User 3. Alternatively, a graphical representation 26 representative of the group of users 18 (e.g., associated with a "leader" of the group of users 18) could be distributed. In this case, it is assumed that the leader can guarantee that the other people in the group of users 18 are supposed to be part of the conference call.

If the matching system 24 is unable to match a graphical representation 26 to a phone number determined by the caller ID system 22, or if the caller has blocked caller ID, the distribution system 32 distributes a notification 36 to that effect to the moderator of the conference call and/or other predetermined user(s) 18. The notification 36 advises the moderator that an unidentified user 18 is attempting to join or has joined the conference call. The notification 36 can comprise a textual message, an icon indicating an unidentified user 18, etc. In response, the moderator can ask the unidentified user 18 to identify themselves. As will be discussed in greater detail below, voice recognition can be used to verify the identity of the unidentified user 18 and to associate that user 18 with a graphical representation 26, which is then distributed to the predetermined set of users 18. The moderator can choose to end the conference call at any time if he/she is not comfortable with the presence of an unidentified user 18.

The identification system 20 further includes a tracking system 38. The tracking system 38 is configured to track, among other possible data, the users 18 on a conference call (e.g., to provide a participant list), the location from which each user 18 is calling from, and the time of participation of each user on the conference call. This data is provided in a log 40 and stored in repository 28. The log 40 can be provided by the distribution system 32 to one or more users 18 (e.g., to the moderator of the conference call).

Figure 3:
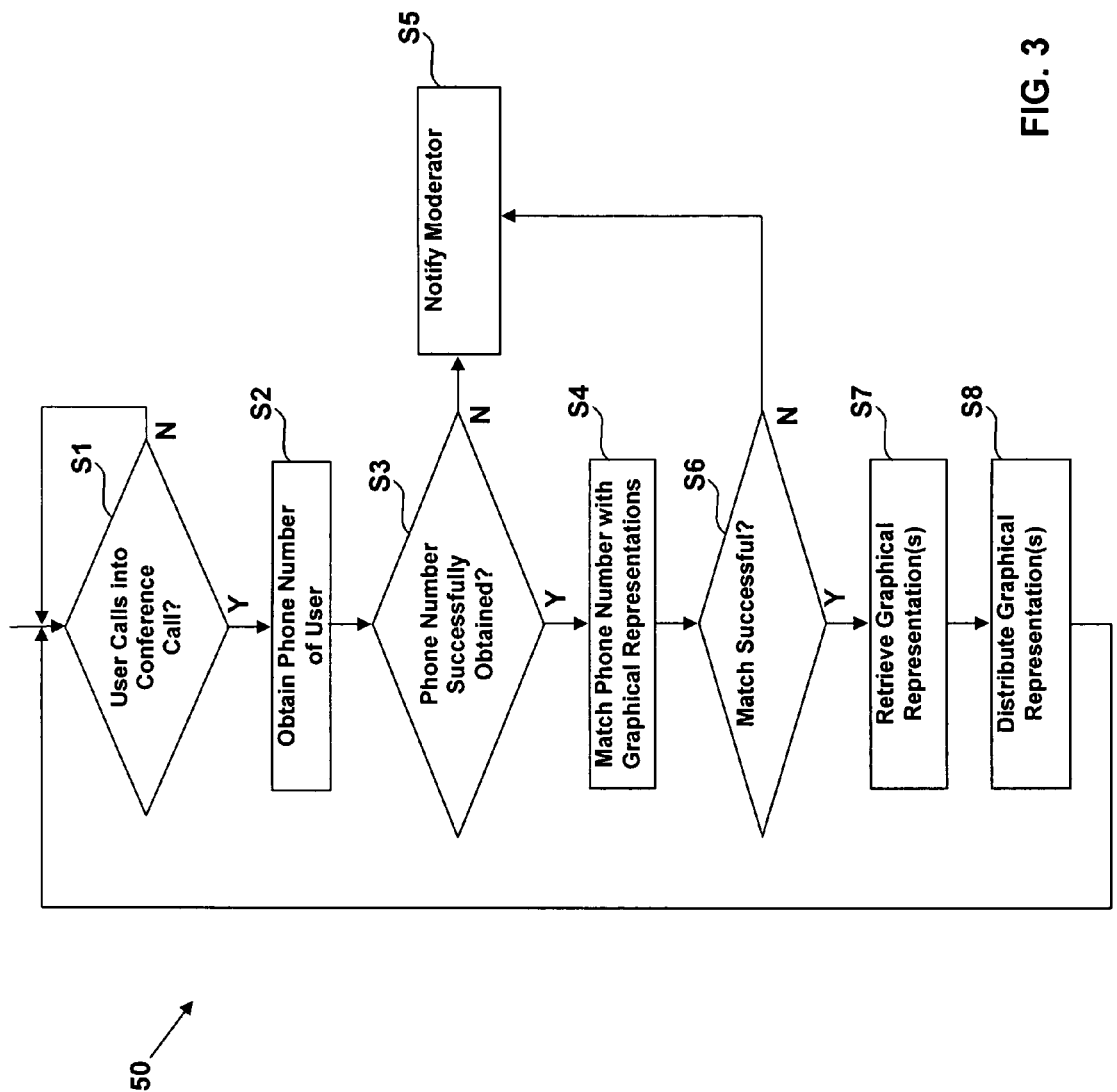
FIG. 3 depicts an illustrative flow diagram of a process in accordance with an embodiment of the present invention.

An illustrative flow diagram 50 of a process in accordance with the present invention is depicted in FIG. 3. The flow diagram 50 will be described below with reference to the system components illustrated in FIG. 2.

In step S1, a user 18 calls into a conference call. In step S2, the caller-ID system 22 attempts to obtain the phone number of the user 18. If it is determined in step S3 that the caller-ID system 22 has successfully obtained a phone number, then in step S4 the matching system 24 attempts to match the phone number with one or more graphical representations 26 stored in the repository 28 and associated with the phone number. If, in step S3, the caller-ID system 22 can not obtain the phone number of the user 18 (e.g., the phone number is caller-ID blocked), then flow passes to step S5, where the moderator is notified that an unidentified user 18 is attempting to join the conference call.

If it is determined in step S6 that the matching system 24 has successfully matched the phone number of the user 18 to one or more graphical representations 26, then the one or more matching graphical representations 26 are retrieved from the repository 28 in step S7 and are distributed by the distribution system 32 to a predetermined set of users 18 participating in the conference call in step S8. Flow then returns to step S1. If a successful match was not found in step S6, the moderator is notified in step S5 that no matching graphical representations 26 exist.

In accordance with another embodiment of the present invention, the identification system 20 further includes a voice identification/recognition system 42 for identifying a user 18 who is calling into a conference call. The voice identification/recognition system 42 can be used in conjunction with the caller ID system 22 or can be used separately to identify a user 18 calling into a conference call. The voice identification/recognition system 22 can perform "voice identification," where the vocal characteristics of a user 18 are matched against known vocal characteristics to identify the user 18, and/or can perform "voice recognition," where a word or series of words specific to a user are recognized.

The voice identification/recognition system 42 is used to verify the identify of a user 18 calling into a conference call. In particular, each user 18 records a "voice key" 44 off-line and then submits the voice key 44 to the repository 28 where it is stored in association with the identity of the user 18. The voice key 44 can comprise a single spoken word (e.g., a password), a series of words (e.g., the full name of the user), a sentence (e.g., "The quick brown fox jumps over the lazy dog."), etc. The voice keys 44 can be unique for each user 18 (e.g., the voice key 44 comprises the name of the user 18 or a unique personal identification number (PIN)). Alternatively, all users 18 can record the same voice key 44. To enhance security, the user 18 can access the repository 28 for storage of the voice key 44 using a log-in procedure (e.g., username/password) or other suitable security protocol.

When a user 18 attempts to join a conference call, the voice identification/recognition system 42 queries the user 18 (e.g., via a recorded message) to speak their voice key 44. The voice identification/recognition system 42 then compares the spoken voice key 44 against the voice keys 44 stored in the repository 28. If a matching voice key 44 is found, the user 18 who is attempting to join the conference call is identified as the user 18 associated with the matching voice key 44. The graphical representation 26 corresponding to the identified user 18 is then retrieved from the repository 28 and distributed by the distribution system 32 to the predetermined set of users 18. If the identified user 18 is a leader of a group of users 18 at a particular location (e.g., in a conference room), it is assumed that the leader can guarantee that the other people in the group of users 18 are supposed to be participating in the conference call.

For added security, the caller ID system 22 and matching system 24 can be used to obtain the phone number of the user 18 who is attempting to join the conference call and to retrieve a graphical representation 26 corresponding to the phone number from the repository 28. The graphical representation 26 associated with the matching voice key 44 and the graphical representation 26 associated with the phone number obtained by the caller ID system 22 can then be compared. If the two graphical representations 26 are the same, then the user 18 is allowed to join the conference call and the graphical representation 26 is distributed. If not, the distribution system 32 distributes a suitable notification 36 regarding the unidentified user 18 to the moderator of the conference call and/or other predetermined user(s) 18. The moderator can then decide whether or not to allow the user 18 to join the conference call.

In accordance with another embodiment of the present invention, the voice keys 44 stored in the repository 28 are downloaded and stored in a local server 46. Then, instead of performing the voice identification comparison in the conference calling center 14, the comparison is performed on the local server 46. This may be useful, for example, if the security of the conference calling center 14 is suspect or does not meet desired security requirements.

Figure 4:
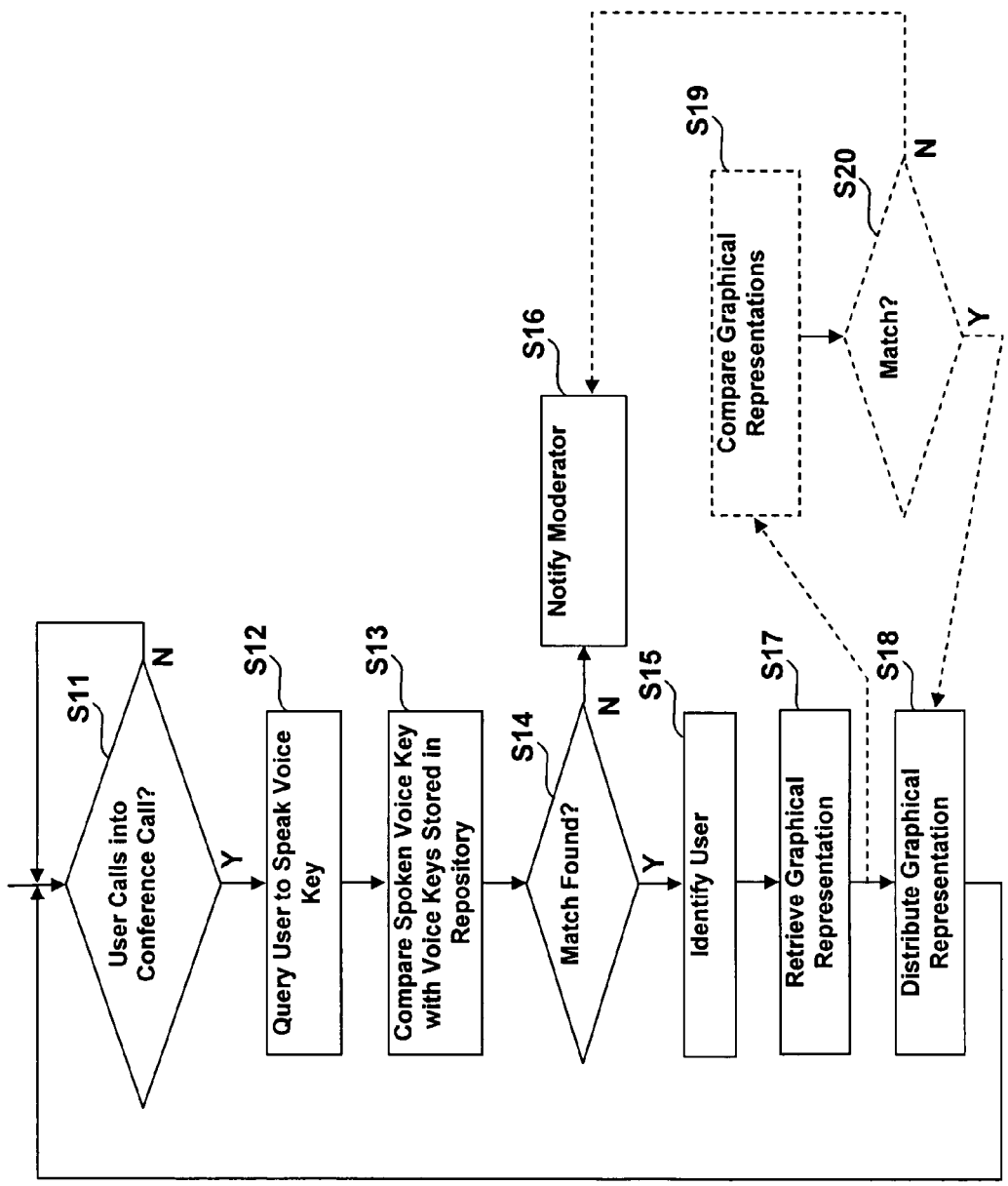
FIG. 4 depicts an illustrative flow diagram of a process in accordance with another embodiment of the present invention.

An illustrative flow diagram 60 of a process utilizing voice identification in accordance with the present invention is depicted in FIG. 4. The flow diagram 60 will be described below with reference to the system components illustrated in FIG. 2.

In step S11, a user 18 calls into a conference call. In step S12, the voice identification/recognition system 42 queries the user 18 (e.g., via a recorded message) to speak their voice key 44. In step S13, the voice identification/recognition system 42 compares the spoken voice key 44 against the voice keys 44 stored in the repository 28. If, in step S14, a matching voice key 44 is found, the user 18 who is attempting to join the conference call is identified in step S15 as the user 18 associated with the matching voice key 44. If not, the moderator is notified in step S16 that an unidentified user 18 is attempting to join the conference call. The graphical representation 26 corresponding to the identified user 18 is retrieved from the repository 28 in step S17 and is distributed by the distribution system 32 to the predetermined set of users 18 in step S18.

An example of the use of the voice identification/recognition system 42 in conjunction with the caller ID system 22 is indicated in phantom in FIG. 4. In particular, in step S19, the graphical representation 26 associated with the matching voice key 44 and the graphical representation 26 associated with the phone number obtained by the caller ID system 22 are compared. If the graphical representations 26 are found to match in step S20, then flow passes to step S18 and the graphical representation 26 associated with the matching voice key 44 is distributed by the distribution system 32. If a match is not found in step S20, the moderator is notified in step S16 that an unidentified user 18 is attempting to join the conference call. To this extent, the user 18 will only be allowed to join the conference call if they are identified by the voice identification/recognition system 42 and the caller ID system 22 determines that the user 18 is calling from one of the specific phone numbers.

In another alternative embodiment, for added security, a voice key 44 of a user 18 can be associated with one or more specific phone numbers (locations). For example, a first voice key 44 of a user 18 may be associated with an office phone number while a second voice key 44 of the user 18 may be associated with a cell phone number. Alternatively, a single voice key 44 may be associated with all phone numbers. Further, a predetermined voice key 44 can be used when a phone number is not associated with a voice key 44 (e.g., the user 18 calls into a conference call while on a business trip).

Figure 5:
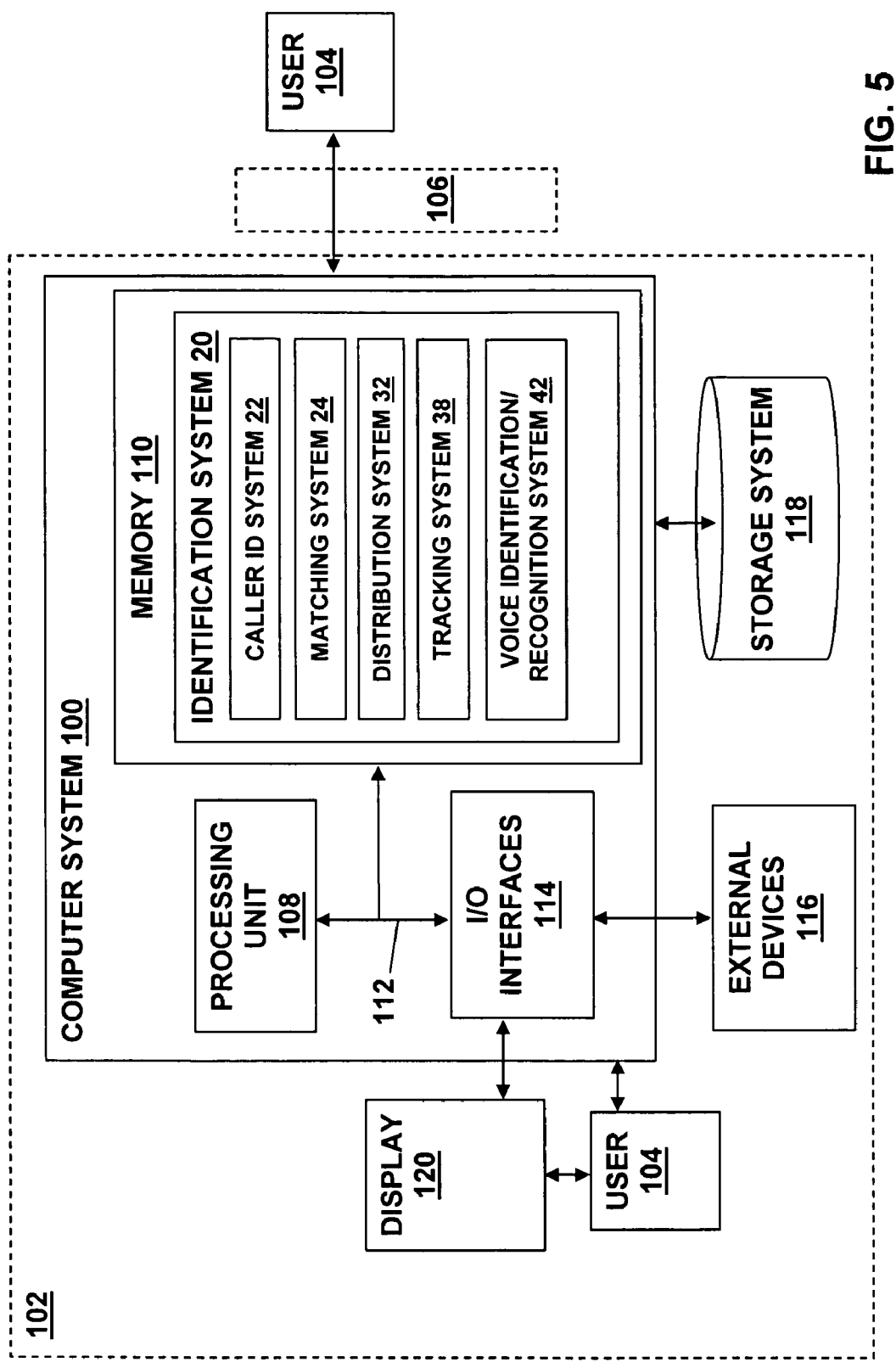
FIG. 5 depicts an illustrative computer system for implementing embodiment(s) of the present invention.

A computer system 100 for implementing a conference calling system including an identification system 20 in accordance with embodiments of the present invention is depicted in FIG. 5. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for displaying images of conference call participants in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as identification system 20, that is stored in memory 110 and/or storage system(s) 118. While executing computer program code, processing unit 108 can read and/or write data, to/from memory 110, storage system (s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable the user 104 to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 5 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. Such information can include, for example, databases 30, graphical representations 26, logs 40, voice keys 44, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is an identification system 20 in accordance with the present invention. The identification system 20 includes a caller ID system 22 for determining what phone numbers are calling into a conference call at any given time and a matching system 24 for associating one or more graphical representations 26, stored in storage unit 118, to each phone number obtained by the caller ID system 22. The identification system 20 also includes a distribution system 32 for distributing the graphical representations 26 provided by the matching system 24 to a predetermined set of users 18 participating in the conference call (e.g., the moderator of the conference call). The identification system 20 further includes a tracking system 38. The tracking system 38 is configured to track, for example, the users 18 on a conference call (e.g., to provide a participant list), the location from which each user 18 is calling from, and the time of participation of each user on the conference call. This data is provided in a log 40 and stored in storage unit 118. The log 40 can be provided by the distribution system 32 to selected users 18.

As shown in FIG. 5, the identification system 20 can also include a voice identification/recognition system 42 for identifying a user 18 who is calling into a conference call. The voice identification/recognition system 42 can be used in conjunction with the caller ID system 22, or separately therefrom, to identify a user 18 calling into a conference call. When a user 18 attempts to join a conference call, the voice identification/recognition system 42 queries the user 18 (e.g., via a recorded message) to speak their voice key 44. The voice identification/recognition system 42 then compares the spoken voice key 44 against the voice keys 44 stored in the repository 28. If a matching voice key 44 is found, the user 18 who is attempting to join the conference call is identified as the user 18 associated with the matching voice key 44. The graphical representation 26 corresponding to the identified user 18 is then retrieved from the storage unit 118 and distributed by the distribution system 32 to the predetermined set of users 18.

The present invention can be offered as a business method on a subscription or fee basis. For example, one or more components of the present invention can be created, maintained, supported, and/or deployed by a service provider that offers the functions described herein for customers. That is, a service provider can be used to provide a service for displaying images of conference call participants, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for displaying images of conference call participants implementing in a conference call system, comprising:

receiving a call from a user to join a conference call, wherein a plurality of users are participating in the conference call;

verifying, using a computer system, an identity of the user who is joining the conference call using a voice key, the verifying comprising:

querying the user to speak the voice key in response to receiving the call from the user to join the conference call;

comparing the spoken voice key against a plurality of stored voice keys to find a matching voice key, wherein each of the plurality of stored voice keys is associated with a different user; and if a matching voice key is found, identifying the user as the user associated with the matching voice key;

obtaining a phone number of each of the plurality of users participating in the conference call using a caller identification system;

matching at least one stored graphical representation to the phone number of each of the plurality of users wherein, in the case that the phone number of a user corresponds to a group of users, the matching further comprises matching a stored graphical representation of each user in the group of users with the phone number;

distributing and displaying all matching graphical representations to all of the plurality of users that are participating in the conference call;

monitoring the plurality of users participating in the conference call;

updating the distributed graphical representations for all of the plurality of users that are participating in the conference call when a user enters or exits the conference call;

tracking at least one of: an identity of each of the plurality of users participating in the conference call, a location from which each of the plurality of users participating in the conference call is calling from, and a time of participation of each of the plurality of users participating in the conference call;

logging results of the tracking; and notifying a moderator of the conference call that an unidentified user is attempting to join the conference call if the matching step is unable to match the phone number to a stored graphical representation.

2. The method for displaying images of conference call participants according to claim 1, the verifying further comprising:

associating a stored graphical representation with the matching voice key of the user;

comparing the graphical representation associated with the matching voice key of the user with the graphical representation matched to the phone number of the user; and allowing the user to join the conference call if the graphical representation associated with the matching voice key of the user is the same as the graphical representation matched to the phone number of the user.

* * * * *